United States Patent [19]

Burns et al.

[11] Patent Number: 6,147,965
[45] Date of Patent: Nov. 14, 2000

[54] SWITCHED CONNECTIONS DIAGNOSTICS IN A SIGNALLING NETWORK

[75] Inventors: John C. Burns, Kanata; Stephen C. Bews, Stittsville; Jonathan L. Bosloy; David Watkinson, both of Kanata, all of Canada

[73] Assignee: Newbridge Networks Corporation, Kanata, Canada

[21] Appl. No.: 09/013,021

[22] Filed: Jan. 26, 1998

[30] Foreign Application Priority Data

Jan. 24, 1997 [CA] Canada ................................. 2195893

[51] Int. Cl.$^7$ ............................ G06F 11/00; H04L 12/28
[52] U.S. Cl. ......................... 370/216; 370/225; 370/242; 370/396
[58] Field of Search .................................. 370/216, 221, 370/225, 228, 237, 238, 242, 244, 248, 249, 250, 395, 396, 397, 400, 409, 410, 236; 340/826, 827; 714/1–4, 732

[56] References Cited

U.S. PATENT DOCUMENTS

| 4,881,230 | 11/1989 | Clark et al. ................................. 714/4 |
| 5,051,996 | 9/1991 | Bergeson et al. ........................ 714/732 |
| 5,271,000 | 12/1993 | Engbersen et al. ...................... 370/244 |
| 5,825,772 | 10/1998 | Dobbins et al. ......................... 370/396 |
| 5,974,046 | 10/1999 | Kim et al. ................................ 370/242 |

OTHER PUBLICATIONS

Haruhiko Matsunaga et al "Virtual Path Trace Function For Effective Administration of ATM Networks" Communications for Global Users, including a Communications Theory Mini Conference Orlando, Dec. 6–9, 1992, Institute of Electrical And Electronics Engineers, pp. 1245–1249. XP000357748 see the whole document Relevant to Claim No. 1–5, 7,9,21,23–26,27,28.

Johnson M A et al, "New Service Testing Functions For Advanced Intelligent Networks" Proceedings of the Network Operations and Management Symposium (NOM, Memphis, Apr. 6–9, 1992 vol. 3, No. –, Jan. 1, 1992 Institute of Electrical and Electronics Engineers, pp. 709–720, XP000344694, see pp. 714 and 718.

Sasisekharan R et al, "Scout: An Approach To Automating Diagnoses of Faults in Large Scale Networks" Proceedings of the Global Telecommunications Conference (Globecom) Houston, Nov. 29–Dec. 2, 1993 . vol. vol. 1, No. –, Nov. 29, 1993, Institute of Electrical and Electronics Engineers, pp. 212–216, XP000428056 paragraphs 1, 2, 5.

Allwood R J et al, "Diagnosing Faults In A Telecommunications Network By An Expert System" IEE Proceedings I. Solid–State & Electron Devices, vol. 137, No. 5, Oct. 1, 1990 pp. 273–280, XP000170688 see Paragraph 2.

Satoru Ohta et al "Applying OSI Systems Management Standards To Remotely Controlled Virtual Path Testing In ATM Networks" IEICE Transactions On Communications, vol. E76—8, No. 3, Mar. 1, 1993, pp. 280–290, XP000304001 para. VPC/VCC Performance Monitoring.

Farkouh S C "Managing ATM–Based Broadband Networks" IEEE Communications Magazine, vol. 31, No. 5, May 1, 1993 pp. 82–86, XP000367623.

(List continued on next page.)

*Primary Examiner*—Alpus H. Hsu
*Assistant Examiner*—Afsar M. Qureshi
*Attorney, Agent, or Firm*—Marks & Clerk

[57] ABSTRACT

A method is disclosed for detecting and diagnosing faults in a network. The network has a plurality of nodes through which switched virtual connections can be established. First, all attempts at establishing routes through the network are recorded. Then, the location of a failure is determined by analyzing the attempted routes.

18 Claims, 3 Drawing Sheets

OTHER PUBLICATIONS

Miernik J W et al "Contingency Process For S57 Network Failures" Proceedings of the International Switching Symposium, Yokohama, Oct. 25–30, 1992, vol. vol. 1 No. Symp. 14, Oct. 25, 1992, Institute of Electronics Information and Communications Engineers pp. 164–168, XP000337636.

Brown Jr B et al "Common Channel Signaling In The AT&T U.S. 5ESS Switch" Proceedings of the IEEE, vol. 80, No. 4, Apr. 1, 1992, pp. 618–627, XP000304352 pargraphs IV. A—E.

"An alternate Path Routing Scheme Supporting QOS and Fast Connection Setup in ATM Networkw" by Spiegel et al., pp. 1224–1230. IEEE, Nov. 1994.

SWITCHED CONNECTIONS DIAGNOSTICS IN A SIGNALLING NETWORK

FIELD OF THE INVENTION

This invention relates to the field of digital networks, for example, asynchronous transfer mode (ATM) networks and, more particularly, to a methodology for detecting and diagnosing switched connection failures in a signaling network when attempting to setup a call.

BACKGROUND OF THE INVENTION

Network switches, controlled by signaling software, can dynamically setup end-to-end connections across the network, for instance, Switched Virtual Channel (SVC) or Soft Permanent Virtual Channel (SPVC) connections in an ATM network. Sometimes these connections fail to route successfully.

Today's signaling software provides very simple cause and diagnostics information to aid in trouble shooting failed call attempts. Often, the cause and diagnostics are inadequate to trouble shoot the root cause of the problem as only a single reason is provided as to the failure. Much manual work, often involving more than one operations person, must be done to actually locate the root cause of the problem. This becomes very costly in terms of network resources and time.

More detailed connection diagnostics are required to aid in troubleshooting in these situations.

SUMMARY OF THE INVENTION

An object of the present invention is to alleviate the prior art problem.

According to the present invention there is provided a method of diagnosing faults in a network having a plurality of nodes through which switched virtual connections can be established, comprising the steps of recording all attempts at establishing routes through the network; and analyzing the attempted routes to identify the source of a failure.

The switched connection diagnostics functionality, embodying the present invention, collects details in call processing messages for each switch and physical trunk visited plus rejection causes for every attempted route during the call setup phase. The collected information is returned in the call processing messages back to the source switch which in turn presents this information to network operators. These details enable the network operators to easily isolate and troubleshoot problems.

This invention enables signaling software to gather detailed information for a switched connection for every leg of a call setup rather than simply providing one reason as to routing failure, thus allowing quick problem resolutions with minimal effort.

The invention also provides a packet switched data communications network, comprising a plurality of interconnected network nodes; a plurality of users connected to at least some of said network nodes; means for attempting to establish virtual connections between users over a plurality of alternate routes through said network; and means for recording, in a diagnostic mode, attempts at establishing routes through said network; and diagnostic means for analyzing said recorded attempts to identify the source of a failure.

BRIEF DESCRIPTION OF THE DRAWINGS

The invention will now be described in more detail, by way of example, with reference to the accompanying drawings, in which.

DETAILED DESCRIPTION

Figure 1:
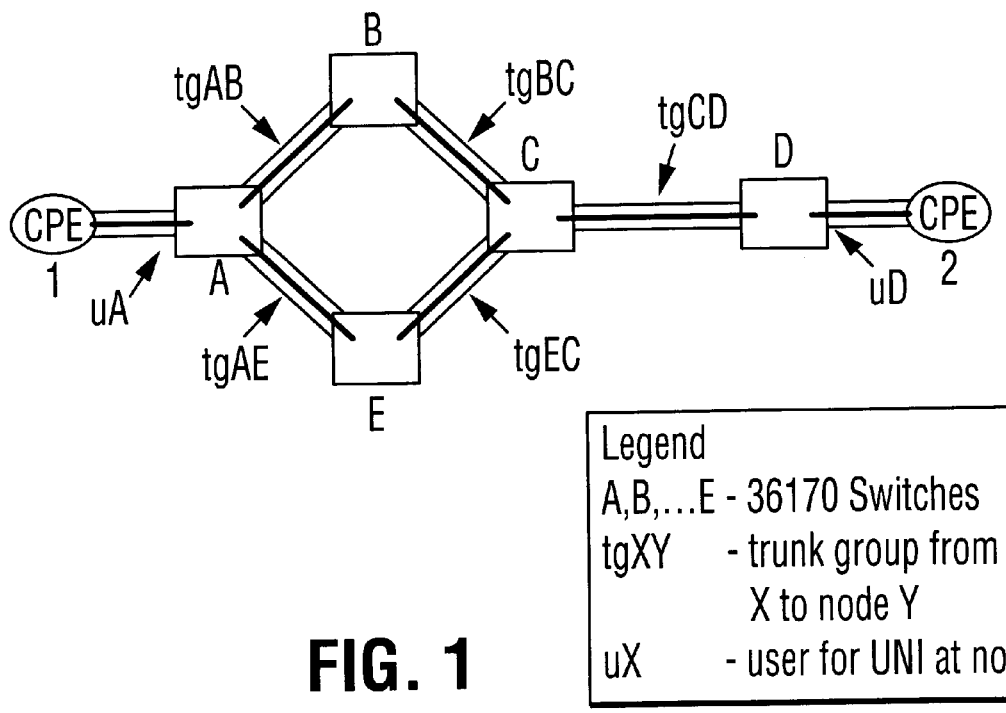
FIG. 1 illustrates a communications network capable of establishing switched virtual connections.

In FIG. 1, tgXY, where X, Y can be a node A, B, C, D, E represents a trunk group from the node X to the node Y and uX represents a user, i.e. a service subscriber, for a user network interface (UNI) at the node X. The nodes represented by the letters A to E are typical switches, such as, Newbridge Networks Corporation's 36170 switches. For example, tgAB is the trunk group between switches A and B while uA and uD are users for the UNIs at respective nodes A and D.

A switched virtual channel (SVC) connection can be setup from Customer Premise Equipment 1 (CPE-1) to Customer Premise Equipment 2 (CPE-2) using users uA and uD for the calling and called addresses, respectively. Alternatively, a soft permanent virtual channel (SPVC) connection can be setup from the port on A where CPE-1 is attached at uA to the port on D where CPE-2 is attached at uD. If a routing problems occurs with either the SVC or SPVC connection setups, then the following steps should be taken to diagnose the problem depending on the type of connection.

SVC Case:

A customer at CPE-1 complains that its application is not functioning. The Service Provider turns on or activates the switched connection diagnostics for user uA, and instructs the customer to try the application again. The SVC connection setup is retried and switched connection diagnostics are collected. The results from the diagnostics are analyzed. By using the routing reject points, the Service Provider can locate and then correct the problem in the network. The Customer retries his application and is once again back in service.

SPVC Path Case #1—Path is Waiting For Resources:

The Service Provider configures an SPVC path from user uA to user uD, and connects it. The path setup enters a Waiting for Resources state. The Service Provider initiates the switched connection diagnostics for the specific problematic SPVC path. The SPVC path is retried and switched connection diagnostics are collected. The results from the diagnostics are analyzed. By using the routing reject points, the Service Provider can locate and then correct the problem in the network. The SPVC path is retried. The call is completed and now enters the connected state.

SPVC Path Case #2—Path is Connected:

The Service Provider configures an SPVC path from user uA to user uD, and connects it. The path enters the connected state. The Service Provider desires to determine the reason why the path took the route it did. The Service Provider initiates the switched connection diagnostics for the specific SPVC path.

A bridge and roll optimize operation is performed on the path in order to gather switched connection diagnostics for the path. International application PCT/CA97/00507, filed Jul. 17, 1997, describes an implementation of the bridge and roll operation. This operation may be service affecting.

However, if it is completed close to the instance at which the path was first connected, there is a high probability that a more optimal route does not exist. The results are analyzed and routing reject points can then be further investigated to discern the cause of the path's present routing.

For a specific example of an application of the switched connection diagnostics, assume each switch has routing tables allowing uA to route an SVC to uD, and assume tgCD has no remaining bandwidth for the SVC. The SVC would start from A, use tgAB (assume primary trunk group) to get to B, then proceed to use tgBC to get to C. Once at C, routing determines that tgCD is full and cranks back to B. B then cranks back to A as there are no other routes from B to D. A crankback occurs when a node passes a call back to a previous node because it is unable to establish an onward connection. From A, the alternate trunk group tgAE is used. From E, tgEC is used, and again at C, routing determines tgCD is full and cranks back to E. E then cranks back to A as there are no other routes from E to D. Now A has exhausted its routes so the SVC is released back to CPE 1.

Switched connection diagnostics record all routes attempted, i.e. A, tgAB, B, tgBC, C, reject reasons (cause and diagnostics), A, tgAE, E, tgEC, C, reject reasons. If this list is followed, it can be determined that all roads lead to C, but there is NO usable route from C to D. The next step in the procedure is to focus diagnostics efforts at C to determine why tgCD is not usable.

Having regard specifically to SVC switched connection diagnostics, SVCs are setup from user terminal to user terminal across the network. The point of attachment into the network from the user terminal defines the entry and exit points for the SVC. The point of attachment is defined by a Call Processing User and its physical access i.e. its Trunk Group and the controlling signalling link. The switch routes an SVC from the User at the entry point to the User at the exit point. Routing tables, either static or dynamic, present in each node steer SVC setup messages from the source User to the destination User. When routing chooses a route, i.e. a trunk group, the signalling message is sent out on the signalling link controlling the trunk group.

For SVCs, switched connection diagnostics are provided on a per User basis, and may be turned on (activated) or off (de-activated). The default for diagnostics is off, awaiting activation.

Every calling User that originates an SVC when switched connection diagnostics are activated will gather diagnostics information during call setup. This enables an end-user application to startup. The end-user has the opportunity to signal potentially more than one SVC, and diagnostics will gather information on all SVCs originated from the application.

If diagnostics are not de-activated for a User after an SVC routing problem has been diagnosed, then call setup performance for the User will be degraded as unwanted diagnostic information is collected for every call on the User. To guard against inadvertently leaving switched connection diagnostics active, the diagnostics are gathered for a predetermined number of connection setups, for example the first 10 SVCs/SPVC paths setup for the User. After 10 calls for the User, the switched connection diagnostics deactivates itself.

If switched connection diagnostics are active for a User, and that User is the destination of a call, there is no effect. Switched connection diagnostics applies only to calls originated by a User.

In the case of SPVC switched connection diagnostics, the SPVC path definition contains the source, destination and administrative information for connection setup. The SPVC connection setup procedure initiates an SVC from the source endpoint towards the destination endpoint, and therefor uses the same routing procedures as SVCs. In one reference model, the SPVC path endpoints are the ports on the switch where the customer premise equipment (CPEs) are attached. The Users, i.e. uA and uD, plus port and endpoint information define the endpoints for the SPVC path. Again, routing uses routing tables, either static or dynamic, present in each node to steer SPVC setup messages from the source User to the destination User.

Switched connection diagnostics are provided on a per SPVC path basis, and may be turned on or off for the next SPVC path setup attempt. By default, the diagnostics are off. Once switched connection diagnostics have been turned on for an SPVC path, the next time the SPVC path is setup, diagnostics information are collected for that SPVC.

When an SVC or SPVC call is being setup, routing attempts to route the call from source to destination. It uses loop detection and crankback optimizations to route the call. In this process, many different routes may be attempted. For every route tried, each switch and trunk group traversed is recorded. When a route is rejected, the reason is also recorded. A node management (Node Management Terminal Interface or NMTI) or network management system can interpret this information to illustrate the routing points of failure.

Depending on the circumstances, switched diagnostics may provide more information when employed with hop-by-hop routing to setup a call, in comparison to source routing for call setup. A particular source routing technique is Private Network Node Interface (PNNI), wherein routing tables are regenerated and distributed to all nodes running PNNI. If a node becomes isolated because the physical access to it fails, then all routes to the isolated node are removed from all routing tables. For example, in FIG. 1, if node D goes off-line, then all routing tables (at nodes A, B, C and E) will not have an entry for the Users on node D. Therefore, the routing of an SVC or SPVC path from uA to uD will fail at node A and never leaves the node. The switched connection diagnostics information will contain node A, and a cause indicating that the destination is unreachable. Otherwise, if the routing tables are static hop-by-hop, much more diagnostic information typically would be gathered as routing attempts to use all configured routes that lead to D. All cause codes recorded at C will indicate that resources are unavailable.

Figure 2:
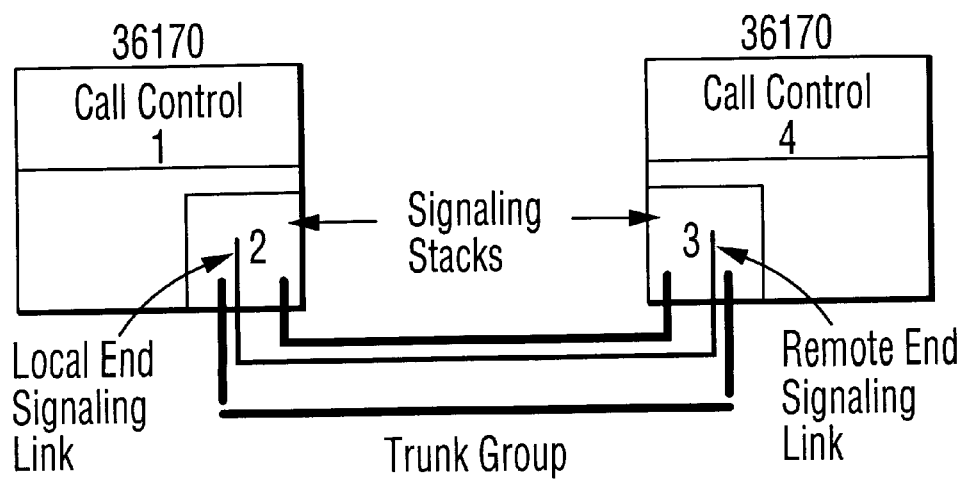
FIG. 2 illustrates diagnostics points of failure between two network switches.

Turning to FIG. 2, illustrated is an exemplary signalling message exchange between two call control entities of respective network switches in order to setup a call. On the Newbridge 36170 switch, service cards perform the call control and signalling functions depicted. When routing chooses a trunk group, an SVC/SPVC setup request is forwarded out the signalling link that controls the trunk group. FIG. 2 illustrates the scenarios that can result between the switches:

1. Call control forwards the setup message to the local signalling stack.
2. The local signalling stack rejects the message and returns failure to local call control.
3. The local signalling stack forwards the setup message to the remote signalling stack. The remote signalling rejects the setup message and informs the local signalling stack of the rejection. The remote Call Control engine is not informed whatsoever.
4. Remote call control software in the switch on the remote side of the signalling link receives the SVC/SPVC setup message and processes it.

The first and fourth scenarios are processed by call control which logs diagnostics at this level. However, if scenarios two or three occur, then the diagnostic information must reflect this. If the local end rejects the call, then perhaps the service card servicing the signalling link is overburdened. If the remote end rejects the call, then perhaps the service card at the remote end is overburdened. This information pinpoints perhaps a troubled service card.

Diagnostics are collected on a per service card basis. The service card, that manages the SVC User and SPVC path, collects switched connection diagnostics information when diagnostics is enabled. The service card can store switched connection diagnostics information for a predetermined number, say only 50 SVC or SPVC path setup attempts. The 50 most recent setup attempts are stored. This should be sufficient to allow several external network management requests to initiate switched connection diagnostics requests, then subsequently collect the results.

The enhanced signalling used to carry diagnostics information will now be described in more detail. Enhanced signalling is achieved by using information elements (IEs) defined to be in "Codeset 6", information elements specific to the local network.

The ITU-T Q.2931 signalling specification standardized coding format for information elements is followed.

Therefore, all information elements contain an Information Element Identifier, Length and Instruction fields as shown below.

| 8 | 7 | 6 | 5 | 4 | 3 | 2 | 1 | Octet |
|---|---|---|---|---|---|---|---|---|
|   |   | Information Element Identifier |   |   |   |   |   | 1 |
| 1 | 0 | 0 | 1 | 0 | 0 | 0 | 1 | 2 |
| Ext |   |   | Coding Std | Flag | Res |   | IE Action Ind |   |
|   |   |   | Length |   |   |   |   | 3 |
|   |   |   | Length (continued) |   |   |   |   | 4 |

The contents of the IE instruction field are always coded with a Flag of 'follow explicit instructions' and an IE Action Indicator of 'discard information element and proceed'.

New information element identifiers are allocated so as to not collide with "Codeset 0" identifiers. Codeset 6 information elements are preceded in a message by a Broadband Locking Shift information element. Non locking shift procedures are not supported.

| 8 | 7 | 6 | 5 | 4 | 3 | 2 | 1 | Octet |
|---|---|---|---|---|---|---|---|---|
| 0 | 1 | 1 | 0 | 0 | 0 | 0 | 0 | 1 |
|   |   | Broadband Locking Shift IE Identifier |   |   |   |   |   |   |
| 1 | 0 | 0 | 1 | 0 | 0 | 0 | 1 | 2 |
| Ext |   | Coding Std | Flag | Res |   | IE Action Ind |   |   |

| 8 | 7 | 6 | 5 | 4 | 3 | 2 | 1 | Octet |
|---|---|---|---|---|---|---|---|---|
|   |   | Length of Broadband Locking Shift IE |   |   |   |   |   | 3 |
|   |   | Length of Broadband Locking Shift IE (continued) |   |   |   |   |   | 4 |
| 1 | 0 | 0 | 0 | 0 | 1 | 1 | 0 | 5 |
| Ext |   | Spare |   |   | Codeset Identifier |   |   |   |

The purpose of the Locking Shift information element is to indicate the new active Codeset of succeeding information elements. The specified Codeset remains active until another locking shift is encountered indicating the new active Codeset. Coding Standard (octet 2) is used to indicate ITU-T standardized coding. The Flag (octet 2) indicates to follow explicit instructions of the action indicator. The IE action indicator (octet 2) indicates to discard information element and proceed. The Codeset Identifier (octet 5) identifies the Codeset, in this case Codeset 6.

Coding Rules as specified by the ITU-T and ATM Forum are followed. The following Table specifies information elements used for enhanced signalling. The identifier, maximum length and maximum number of occurrences are given for each information element.

| Bits | | | | | | | | Information Element | Max Length (Bytes) | Max no of Occurrences |
|---|---|---|---|---|---|---|---|---|---|---|
| 8 | 7 | 6 | 5 | 4 | 3 | 2 | 1 | | | |
| 0 | 0 | 0 | 0 | 0 | 0 | 1 | 1 | Call Trace | 1476 | 1 |
| 0 | 1 | 1 | 0 | 0 | 0 | 0 | 1 | Broadband locking shift | 5 | 1 |

There are four particular messages which are used for enhanced signalling procedures: Connect, Setup, Release, and Release Complete messages. Each can include the Broadband Locking Shift information element, followed by a Call Trace information element which may have a length ranging from 20 to 1476 octets. Details of the Call Trace IE a given below.

A Connect message is used to return call trace information to the originating node on a Successful call completion. Both the Release and the Release Complete messages are used to transfer the reason for a routing failure. Information about the routing failure can be carried in either a Cause information element or optionally the Call Trace information element. Only the cause of the routing failure is carried in the Cause IE whereas the Call Trace IE carries complete information. The Setup message is used to collect call tracing information inside the call trace IE as the message traverses the network.

The purpose of the Call Trace IE is to trace the progress of a call as it traverses the network. The information relating to the node address, port and rejection causes is collected, as well as failure reasons and extra diagnostic information. The Call Trace IE contents form an ordered list representing node traversal information in chronological order. Each asterisked octet group represents a sub-structure and may be repeated in the Call Trace IE, 0 or more times while appearing in any order.

| 8 | 7 | 6 | 5 | 4 | 3 | 2 | 1 | Octet |
|---|---|---|---|---|---|---|---|-------|
| 0 | 0 | 0 | 0 | 0 | 0 | 1 | 1 | 1 |
| | | Call Trace IE Identifier | | | | | | |
| 1 | 0 | 0 | 1 | 0 | 0 | 0 | 1 | 2 |
| Ext | Codng Std | Flag | Res | | IE Action Ind | | | |
| | | Length of Call Trace IE | | | | | | 3 |
| | | Length of Call Trace IE (continued) | | | | | | 4 |
| 0 | 0 | 0 | 0 | 0 | 0 | 0 | 1 | 5* |
| | | Call Transited Indication | | | | | | |
| | | Call Transited Information | | | | | | 5.1* etc. |
| 0 | 0 | 0 | 0 | 0 | 0 | 1 | 0 | 6* |
| | | Call Blocked Indication | | | | | | |
| | | Call Blocked Information | | | | | | 6.1* etc. |
| 0 | 0 | 0 | 0 | 0 | 0 | 1 | 1 | 7* |
| Call Blocked After Transit Indication | | | | | | | | |
| Call Blocked After Transit Information | | | | | | | | 7.1* etc. |
| 0 | 0 | 0 | 0 | 0 | 1 | 0 | 0 | |
| Call Completed Indication | | | | | | | | |
| Call Completed Information | | | | | | | | 8.1* etc. |

Each Call Trace IE is comprised of four components: Call Transited Indication, Call Blocked Indication, Call Blocked After Transit Indication, and Call Completed Indication. Each of the aforementioned components has a common structure. This structure consists of the component identifier, the length of the structure, and the component data.

The Call Transited Indication (octet group 5 of Call Trace IE) denotes the successful traversal of a single node in the network. As shown in the format below, both node and port information are included.

| 8 | 7 | 6 | 5 | 4 | 3 | 2 | 1 | Octet |
|---|---|---|---|---|---|---|---|-------|
| 0 | 0 | 0 | 0 | 0 | 0 | 0 | 1 | 5.1 |
| | | Call Transited Indication | | | | | | |
| | | Length | | | | | | 5.2 |
| 0 | 0 | 0 | 0 | 1 | 0 | 0 | 1 | 5.3 |
| Reserved | | | | Slot Format Identifier | | Address Identifier | | |
| | | Domain | | | | | | 5.4 |
| | | Domain (continued) | | | | | | 5.5 |
| | | Major Node Number | | | | | | 5.6 |
| | | Major Node Number (continued) | | | | | | 5.7 |
| | | Inbound Slot Number | | | | | | 5.8 |
| | | Inbound Slot Number (continued) | | | | | | 5.9 |
| | | Inbound Port Number | | | | | | 5.10 |
| | | Inbound Sub-Port | | | | | | 5.11 |
| | | Inbound Sub-Port (continued) | | | | | | 5.12 |
| 0 | 0 | 0 | 0 | Outbound Selection Type | | | 0/1 Flag | 5.13 |
| Reserved | | | | | | | | |
| | | Outbound Slot Number | | | | | | 5.14 |
| | | Outbound Slot Number (continued) | | | | | | 5.15 |
| | | Outbound Port Number | | | | | | 5.16 |
| | | Outbound Sub-Port | | | | | | 5.17 |
| | | Outbound Sub-Port (continued) | | | | | | 5.18 |

The following list details the individual fields of the Call Transited Indication sub-structure:

Call Transited Indication (octet 5.1)—This field identifies the component type of the sub-structure, i.e., a route success indicator.

Length (octet 5.2)—The length of the sub-structure is defined as the length of the entire sub-structure less the length and sub-structure identifier fields.

Reserved (octets 5.3 and 5.13)—The reserved fields are ignored on receipt and coded as zero when added to the information element.

Slot Format Identifier (octet 5.3)—The format of the inbound and outbound slots are specified by this field. For example "001" defines a 16-bit slot number consisting of an 11-bit shelf number and a 5-bit slot number.

Address Identifier (octet 5.3)—The Address Identifier indicates the type of node address that follows. For example "001" represents a Newbridge specific Control Packet Switching System (CPSS) address. Bit pattern "010" represents a Point Code. If the Address Identifier indicates a Point Code, the domain and major node number are replaced by a 22-octet binary number identifying the point code.

Domain (octets 5.4–5.5)–This field defines the domain part of the CPSS address.

Major Node Number (octets 5.6–5.7)—This field defines the major node number of the CPSS address.

Slot Numbers (octets 5.8–5.9 and 5.14–5.15)–The first octet pair defines the ingress slot number of the call, and the second octet pair defines the egress slot number of the call.

Port Numbers (octets 5.10 and 5.16)—The respective fields identify the ingress and egress port numbers of the call.

Sub-Port Number (octets 5.11–5.12 and 5.17–5.18)—The respective octet pair fields identify the inbound and outbound sub-ports. The interpretation of these fields are protocol dependent. For cell relay based protocols, the Sub-Port Number fields define the Virtual Path Identifier. The first octet pair defines the ingress virtual path of the call, and the second octet pair defines the egress virtual path of the call.

Selection Type (octet 5.13)—This field identifies the outbound port/sub-port selection type as being either "001" which represents the preferred route or "010" which represents the primary alternate route.

Flag (octets 5.13)–This field indicates an Assigning ('1') or Non-Assigning ('0') interface.

The Call Blocked Indication (octet group 6 of Call Trace IE) denotes the failure of a call to traverse a single node in the network. The sub-structure includes node and port information, the ingress port/sub-port as well as the reason for call blockage.

| 8 | 7 | 6 | 5 | 4 | 3 | 2 | 1 | Octet |
|---|---|---|---|---|---|---|---|-------|
| 0 | 0 | 0 | 0 | 0 | 0 | 1 | 0 | |
| Call Blocked Indication | | | | | | | | 6.1 |
| Length | | | | | | | | 6.2 |
| 0 | 0 | 0 | 0 | 1 | 0 | 0 | 1 | 6.3 |
| Reserved | | | | Slot Format Identifier | | Address Identifier | | |
| | | Domain | | | | | | 6.4 |
| | | Domain (continued) | | | | | | 6.5 |
| | | Major Node Number | | | | | | 6.6 |
| | | Major Node Number (continued) | | | | | | 6.7 |
| | | Slot Number | | | | | | 6.8 |
| | | Slot Number (continued) | | | | | | 6.9 |
| | | Port Number | | | | | | 6.10 |
| | | Sub-Port | | | | | | 6.11 |
| | | Sub-Port (continued) | | | | | | 6.12 |
| | | Cause Value | | | | | | 6.13 |
| | | Diagnostics Cause Value | | | | | | 6.14 |

-continued

| 8 | 7 | 6 | 5 | 4 | 3 | 2 | 1 | Octet |
|---|---|---|---|---|---|---|---|---|
| | | Diagnostics Cause Value (continued) | | | | | | 6.15 |
| | | Length of Diagnostics | | | | | | 6.16 |
| | | Diagnostics | | | | | | 6.17 etc. |

The following list details the specific fields of the Call Blocked Indication sub-structure:

Call Blocked Indication (octet 6.1)—This field identifies the component type of the sub-structure, i.e., a call blocked opcode.

Length (octet 6.2)—The length of the sub-structure is defined as the length of the entire sub-structure less the length and sub-structure identifier fields.

Reserved (octet 6.3)—The reserved field is ignored on receipt and coded as zero when added to the information element.

Slot Format Identifier (octet 6.3)—The format of the inbound slot is specified by this field. For example "001" defines a 16-bit slot number consisting of an 11-bit shelf number and a 5-bit slot number.

Address Identifier (octet 6.3)—The Address Identifier indicates the type of node address that follows. For example "001" represents a Newbridge specific Control Packet Switching System (CPSS) address. Bit pattern "010" represents a Point Code. If the Address Identifier indicates a Point Code, the domain and major node number are replaced by a 22-octet binary number identifying the point code.

Domain (octets 6.4–6.5)—This field defines the domain part of the CPSS address.

Major Node Number (octets 6.6–6.7)—This field defines the major node number of the CPSS address.

Slot Number (octets 6.8–6.9)—The octet pair defines the ingress slot number of the call.

Port Number (octet 6.10)—This field identifies the ingress port number of the call.

Sub-Port Number (octets 6.11–6.12)—This octet pair field identifies the inbound sub-port. The interpretation of this field is protocol dependent. For cell relay based protocols, the field defines the Virtual Path Identifier and the octet pair identifies the ingress virtual path of the call.

Cause Value (octet 6.13)—The standard cause values are defined in Q.2610. Theses values define the reason for the routing failure. The cause value is associated with the port that has been most recently traversed.

Diagnostics Cause Value (octets 6.14 and 6.15)—This field stores user defined (i.e., proprietary) cause values to aid network diagnostics.

Length of Diagnostics (octet 6.16)—This defines the length of the Diagnostics field.

Diagnostics (octet 6.17 etc.)—This field contains diagnostic information added to the sub-structure to aid in locating the network failures.

The Call Blocked After Transit Indication (octet group 7 of Call Trace IE) denotes a failure of a call to traverse a single node in the network. The sub-structure includes node and port information. In addition, incoming and outgoing port/sub-port (VPI) may be present. The Call Blocked After Transit Indication always contains information to indicate the cause of the route failure at that point in the network.

| 8 | 7 | 6 | 5 | 4 | 3 | 2 | 1 | Octet |
|---|---|---|---|---|---|---|---|---|
| 0 | 0 | 0 | 0 | 0 | 0 | 1 | 1 | |
| | | Call Blocked After Transit Indication | | | | | | 7.1 |
| | | Length | | | | | | 7.2 |
| 0 | 0 | 0 | 0 | 1 | 0 | 0 | 1 | 7.3 |
| | Reserved | | | Slot Format Identifier | | | Address Identifier | |
| | | Domain | | | | | | 7.4 |
| | | Domain (continued) | | | | | | 7.5 |
| | | Major Node Number | | | | | | 7.6 |
| | | Major Node Number (continued) | | | | | | 7.7 |
| | | Slot Number | | | | | | 7.8 |
| | | Slot Number (continued) | | | | | | 7.9 |
| | | Port Number | | | | | | 7.10 |
| | | Sub-Port | | | | | | 7.11 |
| | | Sub-Port (continued) | | | | | | 7.12 |
| | | Outbound Slot Number | | | | | | 7.13 |
| | | Outbound Slot Number (continued) | | | | | | 7.14 |
| | | Outbound Port Number | | | | | | 7.15 |
| | | Outbound Sub-Port | | | | | | 7.16 |
| | | Outbound Sub-Port (continued) | | | | | | 7.17 |
| | | Cause Value | | | | | | 7.18 |
| | | Diagnostics Cause Value | | | | | | 7.19 |
| | | Diagnostics Cause Value (continued) | | | | | | 7.20 |
| | | Length of Diagnostics | | | | | | 7.21 |
| | | Diagnostics | | | | | | 7.22 etc. |

The following list details the specific fields of the Call Blocked After Transit Indication sub-structure:

Call Blocked After Transit Indication (octet 7.1)—This field identifies the component type of the sub-structure, e.g., a call block after transit opcode.

Length (octet 7.2)—The length of the sub-structure is defined as the length of the entire sub-structure less the length and sub-structure identifier fields.

Reserved (octet 7.3)—The reserved fields are ignored on receipt and coded as zero when added to the information element.

Slot Format Identifier (octet 7.3)—The format of the inbound and outbound slots are specified by this field. For example "001" defines a 16-bit slot number consisting of an 11-bit shelf number and a 5-bit slot number.

Address Identifier (octet 7.3)—The Address Identifier indicates the type of node address that follows. For example "001" represents a Newbridge specific Control Packet Switching System (CPSS) address. Bit pattern "010" represents a Point Code. If the Address Identifier indicates a Point Code, the domain and major node number are replaced by a 22-octet binary number identifying the point code.

Domain (octets 7.4–7.5)—This field defines the domain part of the CPSS address.

Major Node Number (octets 7.6–7.7)—This field defines the major node number of the CPSS address.

Slot Numbers (octets 7.8–7.9 and 7.13–7.14)—The respective octet pairs define the ingress and egress slot numbers of the call.

Port Numbers (octets 7.10 and 7.15)—The respective fields identify the ingress and egress port numbers of the call.

Sub-Port Numbers (octets 7.11–7.12 and 7.16–7.17)—The respective octet pair fields identify the inbound and outbound sub-ports. The interpretation of these fields is protocol dependent. For cell relay based protocols, the fields define the Virtual Path Identifier. The first octet pair defines the ingress virtual path of the call, and the second octet pair defines the egress virtual path of the call.

Cause Value (octet 7.18)—The standard cause values are defined in Q.2610. Theses values define the reason for the routing failure. The cause value is associated with the port that has been most recently traversed.

Diagnostics Cause Value (octet 7.19–7.20)—This field stores user defined (i.e., proprietary) cause values to aid network diagnostics.

Length of Diagnostics (octet 7.21)—This defines the length of the Diagnostics field.

Diagnostics (octet 7.22 etc)—This field contains diagnostic information added to the sub-structure to aid in locating the network failures.

The Call Completed Indication (octet group 8 of Call Trace IE) denotes the successful traversal of a single node in the network. The sub-structure includes node and port information as shown below.

| 8 | 7 | 6 | 5 | 4 | 3 | 2 | 1 | | Octet |
|---|---|---|---|---|---|---|---|---|------|
| 0 | 0 | 0 | 0 | 0 | 0 | 0 | 1 | | 8.1 |
| | | | Call Completed Indication | | | | | | |
| | | | Length | | | | | | 8.2 |
| 0 | 0 | 0 | 0 | 1 | 0 | 0 | 1 | | 8.3 |
| Reserved | | | Slot Format Identifier | | | Address Identifier | | | |
| | | | Domain | | | | | | 8.4 |
| | | | Domain (continued) | | | | | | 8.5 |
| | | | Major Node Number | | | | | | 8.6 |
| | | | Major Node Number (continued) | | | | | | 8.7 |
| | | | Slot Number | | | | | | 8.8 |
| | | | Slot Number (continued) | | | | | | 8.9 |
| | | | Port Number | | | | | | 8.10 |
| | | | Inbound Sub-Port | | | | | | 8.11 |
| | | | Inbound Sub-Port (continued) | | | | | | 8.12 |
| 0 | 0 | 0 | 0 | | Selection Type | | | 0/1 Flag | 8.13 |
| Reserved | | | | | | | | | |
| | | | Slot Number | | | | | | 8.14 |
| | | | Slot Number (continued) | | | | | | 8.15 |
| | | | Port Number | | | | | | 8.16 |
| | | | Outbound Sub-Port | | | | | | 8.17 |
| | | | Outbound Sub-Port (continued) | | | | | | 8.18 |

The following list details the specific fields of the Call Completed Indication sub-structure:

Call Completed Indication (octet 8.1)—This field identifies the component type of the sub-structure, i.e., a call completed opcode.

Length (octet 8.2)—The length of the sub-structure is defined as the length of the entire sub-structure less the length and sub-structure identifier fields.

Reserved (octets 8.3 and 8.13)—The reserved fields are ignored on receipt and coded as zero when added to the information element.

Slot Format Identifier (octet 8.3)—The format of the inbound and outbound slots are specified by this field. For example "001" defines a 16-bit slot number consisting of an 11-bit shelf number and a 5-bit slot number.

Address Identifier (octet 8.3)—The Address Identifier indicates the type of node address that follows. For example "001" represents a Newbridge specific Control Packet Switching System (CPSS) address. Bit pattern "010" represents a Point Code. If the Address Identifier indicates a Point Code, the domain and major node number are replaced by a 22-octet binary number identifying the point code.

Domain (octets 8.4–8.5)—This field defines the domain part of the CPSS address.

Major Node Number (octets 8.6–8.7)—This field defines the major node number of the CPSS address.

Slot Numbers (octets 8.8–8.9 and 8.14–8.15)—The first octet pair defines the ingress slot number of the call, and the second octet pair defines the egress slot number of the call.

Port Numbers (octets 8.10 and 8.16)—The respective fields identify the ingress and egress port numbers of the call.

Sub-Port Numbers (octets 8.11–8.12 and 8.17–8.18)—The respective octet pair fields identify the inbound and outbound sub-ports. The interpretation of these fields are protocol dependent. For cell relay based protocols, each field defines the Virtual Path Identifier. The first octet pair defines the ingress virtual path of the call, and the second octet pair defines the egress virtual path of the call.

Selection Type (octet 8.13)—The Selection Type identifies outbound port/sub-port selection type, e.g., either "001" which represents the preferred route or "010" which represents the primary alternate route.

Flag (octet 8.13)—This field indicates an Assigning ('1') or Non-Assigning ('0') interface.

In operation, call tracing is established at the exchange originating the call to be traced. At this point, a Call Trace IE is inserted into all calls to be traced. It is only explicitly enabled at the point of origin in the network and is implicitly defined to be active by all other nodes in the network if the Call Trace IE is found to be present.

Call Trace of Successful Calls

1. Actions Required at the Originating Exchange:

a) Initiating a Call Trace:

When a new call is initiated, the originating exchange (i.e., switch) checks for the presence of a Call Trace IE in the call setup message. If not existent, a Call Trace IE without components is inserted.

When an outgoing slot, port, or sub-port is selected, the Call Trace IE is modified before the setup message is forwarded. A 'Call Transited' component, containing the node address, ingress and egress slot/port/sub-port, is appended to the end of the IE. The point of origin has now been traced as the setup message at the exchange.

A copy of the Call Trace IE with the 'Call Transited' structure is saved by the originating exchange.

b) Receipt of a Connect Message:

The originating exchange checks for the presence of the Call Trace IE in the Connect message. If the IE is found, its contents contain a complete trace of -the successful call across the network. The information can be used by the management layer for diagnostic information. The IE is not forwarded to the originating interface if it does not support enhanced signalling.

If the IE is not found, a copy of the Call Trace IE that was saved is added to the Connect message.

2. Actions Required at a Transit Exchange:

a) Receipt of a Setup Message:

Upon successful route selection, the setup message is examined for the presence of a Call Trace IE. If present, a 'Call Transited' component, containing the node address, ingress slot/port/sub-port and egress slot/port/sub-port is appended before the message is forwarded to the next exchange while a copy of the Call Trace IE is locally saved.

b) Receipt of a Connect Message:

The Connect message is examined for the presence of a Call Trace IE. If present, the message is forwarded to the preceding exchange without modification to the Call Trace IE.

If the Call Trace IE is absent, the exchange checks for a previously saved copy. If such a copy exists, it is added without modification to the Connect message. The Connect message is then sent to the preceding exchange. In this case, a complete end-to-end call trace is not being performed.

3. Actions Required at the Destination Exchange:

a) Receipt of a Setup Message:

Upon successful route selection, the setup message is examined for the presence of a Call Trace IE. If present, a 'Call Completed' component is appended to the Call Trace IE. A copy of the Call Trace IE is saved and the Setup message is then forwarded to the destination. The Call Trace IE is removed if enhanced signalling has not been enabled at the destination interface.

b) Receipt of a Connect Message:

The Connect message is examined for the presence of a Call Trace IE. If present, the message is forwarded to the preceding exchange without modification to the Call Trace IE.

If the Call Trace IE is absent, the exchange checks for a previously saved copy. If a copy exists, it is added to the Connect message before the message is forwarded to the preceding exchange.

Call Trace for Unsuccessful Call Establishment

Three levels of information can be provided by a node at the point of failure: a cause value, a diagnostics cause value with user defined (proprietary) diagnostics, or a Call Trace IE. When a failure occurs, a Release or Release Complete message is generated by the exchange at the point of failure. The exchange will incorporate one of the aforementioned levels of failure information into the message. As a result, the preceding node has the responsibility to process the failure information correctly.

1. Actions Required at the Originating Exchange:

a) Detection of a call failure at the originating node:

A Call Trace IE is inserted into the Setup message. When the originating exchange detects that it is unable to process with the call, a 'Call Blocked' component is appended to the Call Trace IE. If enhanced signalling is enabled, the Call Trace IE is copied to the Call Rejection message which is sent to the originating user.

If the originating exchange is unable to include a copy of the Call Trace IE, normal call clearance procedures are followed.

b) Receipt of a Release or Release Complete message with a Call Trace IE:

The Call Trace IE is copied without modification to the Call Clearance message. The message is then sent to the originating user. The Call Trace IE contains a complete trace of the call and can be used by the management layer for local diagnostics.

c) Receipt of a Release or Release Complete message without a Call Trace IE:

The originating exchange determines if a Call Trace IE has been saved for this call. If the IE exists, a 'Call Blocked After Transit' component is appended. The IE is then copied to the Call Clearance message which is then sent to the originating user.

d) Call Failure on receipt of Connect:

A call failure will occur if the exchange is unable to complete the call after receiving a Connect message.

If a Call Trace IE is present in the Connect message, a 'Call Blocked' component is appended. If enhanced signalling is enabled, the component is then copied to the Call Trace IE that is sent to the originating user.

Otherwise, the saved Call Trace IE is copied to the Release message. A 'Call Blocked' component is appended to the Call Trace IE.

If the originating exchange is unable to include a copy of the Call Trace IE, normal call clearance procedures are followed.

2. Actions Required at a Transit Exchange:

a) Detection of a call failure at a Transit Exchange:

At a transit exchange, a Call Trace IE is inserted into the Setup message. When the originating exchange detects that it is unable to process with the call, a 'Call Blocked' component is appended to the Call Trace IE. If enhanced signalling is enabled, the Call Trace IE is copied to the Call Rejection message which is sent to the originating user.

If the originating exchange is unable to include a copy of the Call Trace IE, normal call clearance procedures are followed.

b) Receipt of a Release or Release Complete message with a Call Trace IE:

The Call Trace IE is copied without modification to the Call Clearance message. The message is then sent to the originating user. The Call Trace IE contains a complete trace of the call and can be used by the management layer for local diagnostics.

c) Receipt of a Release or Release Complete message without a Call Trace IE:

The transit exchange determines if a Call Trace IE has been saved for this call. If the IE exists, a 'Call Blocked After Transit' component is appended. The IE is then copied to the Call Clearance message which is then sent to the originating user.

d) Call Failure on receipt of Connect:

A call failure will occur if the transit exchange is unable to complete the call after receiving a Connect message.

If a Call Trace IE is present in the Connect message, a 'Call Blocked' component is appended. If enhanced signalling is enabled, the component is then copied to the Call Trace IE that is sent to the originating user.

Otherwise, the saved Call Trace IE is copied to the Release message. A 'Call Blocked' component is appended to the Call Trace IE.

If the transit exchange is unable to include a copy of the Call Trace IE, normal call clearance procedures are followed.

3. Actions Required at the Destination Exchange:

a) Detection of a call failure at the Destination Exchange:

When the destination exchange determines that it cannot proceed with a call, then if possible, the Call Trace IE included in the Setup message should be copied to the Call Clearance message. A 'Call Blocked' component is then appended to the Call Trace IE.

In all failure cases at the destination exchange, it is possible for a 'Call Blocked' or 'Call Blocked After Transit' component to be appended after a 'Call Completed' component.

b) Receipt of a Release or Release Complete message with a Call Trace IE:

At the destination exchange, the Call Trace IE is copied without modification to the Call Clearance message. The message is then sent to the originating user. The Call Trace IE contains a complete trace of the call and can be used by the management layer for local diagnostics.

c) Receipt of a Release or Release Complete message without a Call Trace IE:

The destination exchange copies the Call Trace IE that has been saved to the Call Clearance message being sent to the preceding exchange. A 'Call Blocked After Transit' component is appended to the Call Trace IE. This implies that the final Call Trace IE will always contain a 'Call Completed' component followed by a Call Trace component.

d) Call Failure on receipt of Connect:

A call failure will occur if the destination exchange is unable to complete the call after receiving a Connect message.

If a Call Trace IE is present in the Connect message, a 'Call Blocked' component is appended. If enhanced signalling is enabled, the component is then copied to the Call Trace IE that is sent to the originating user.

Otherwise, the saved Call Trace IE is copied to the Release message. A 'Call Blocked' component is appended to the Call Trace IE. If a 'Call Blocked' component is added, it may succeed a 'Call Completed' component that was already appended to the Call Trace IE.

If the destination exchange is unable to include a copy of the Call Trace IE, normal call clearance procedures are followed.

Call Trace on Crankback

1. Actions Required at the Originating Exchange:

a) Receipt of Release or Release Complete containing Crankback and Call Trace IE:

If an alternate route is available, the Call Trace IE is copied to the outgoing Setup message and a 'Call Transited' component is appended. A copy of the updated IE is saved locally.

If no alternate route is available, the Call Trace IE is copied to the Release message to be sent to the originating user.

b) Receipt of Release or Release Complete containing Crankback only:

If an alternate route is available, the Call Trace IE that was saved locally is copied to the outgoing Setup message. A 'Call Blocked After Transit' component is appended. When the alternate route is successfully selected, a 'Call Transited' component is then appended. A copy of the updated IE is again saved locally.

If an alternate route is unavailable, the Call Trace IE is copied to the Call Clearance message to be sent to the originating user and a 'Call Blocked After Transit' component is appended.

2. Actions Required at a Transit Exchange:

a) Receipt of Release or Release Complete containing Crankback and Call Trace IE:

At a transit exchange, if an alternate route is available, the Call Trace IE is copied to the outgoing Setup message and a 'Call Transited' component is appended. A copy of the updated IE is saved locally.

If no alternate route is available, the Call Trace IE is copied to the Release message to be sent to the originating user.

b) Receipt of Release or Release Complete containing Crankback only:

At a transit exchange, if an alternate route is available, the Call Trace IE that was saved locally is copied to the outgoing Setup message. A 'Call Blocked After Transit' component is appended. When the alternate route is successfully selected, a 'Call Transited' component is then appended. A copy of the updated IE is again saved locally.

If an alternate route is unavailable, the Call Trace IE is copied to the Call Clearance message to be sent to the originating user and a 'Call Blocked After Transit' component is appended.

3. Actions Required at the Destination Exchange:

a) Receipt of Release or Release Complete containing Crankback and Call Trace IE:

At the destination exchange, if an alternate route is available, the Call Trace IE is copied to the outgoing Setup message and a 'Call Transited' component is appended. A copy of the updated IE is saved locally.

If no alternate route is available, the Call Trace IE is copied to the Release message to be sent to the originating user.

b) Receipt of Release or Release Complete containing Crankback only:

At the destination exchange, if an alternate route is available, the Call Trace IE that was saved locally is copied to the outgoing Setup message. A 'Call Blocked After Transit' component is appended. When the alternate route is successfully selected, a 'Call Transited' component is then appended. A copy of the updated IE is again saved locally.

If an alternate route is unavailable, the Call Trace IE is copied to the Call Clearance message to be sent to the originating user and a 'Call Blocked After Transit' component is appended.

The balance of the figures demonstrate three different trace scenarios that incorporate the aforementioned operations. Symbols used in the diagrams represent the following:

| Symbol | Meaning |
| --- | --- |
| ∂ | User |
| O | Network Node |
| ct | Call Trace IE |
| # | Call Transmitted Indication |
| $ | Call Blocked Indication |
| @ | Call Blocked After Transit Indication |
| ! | Call Completed Indication |
| ( ) | 'Contains' |

Figure 3:
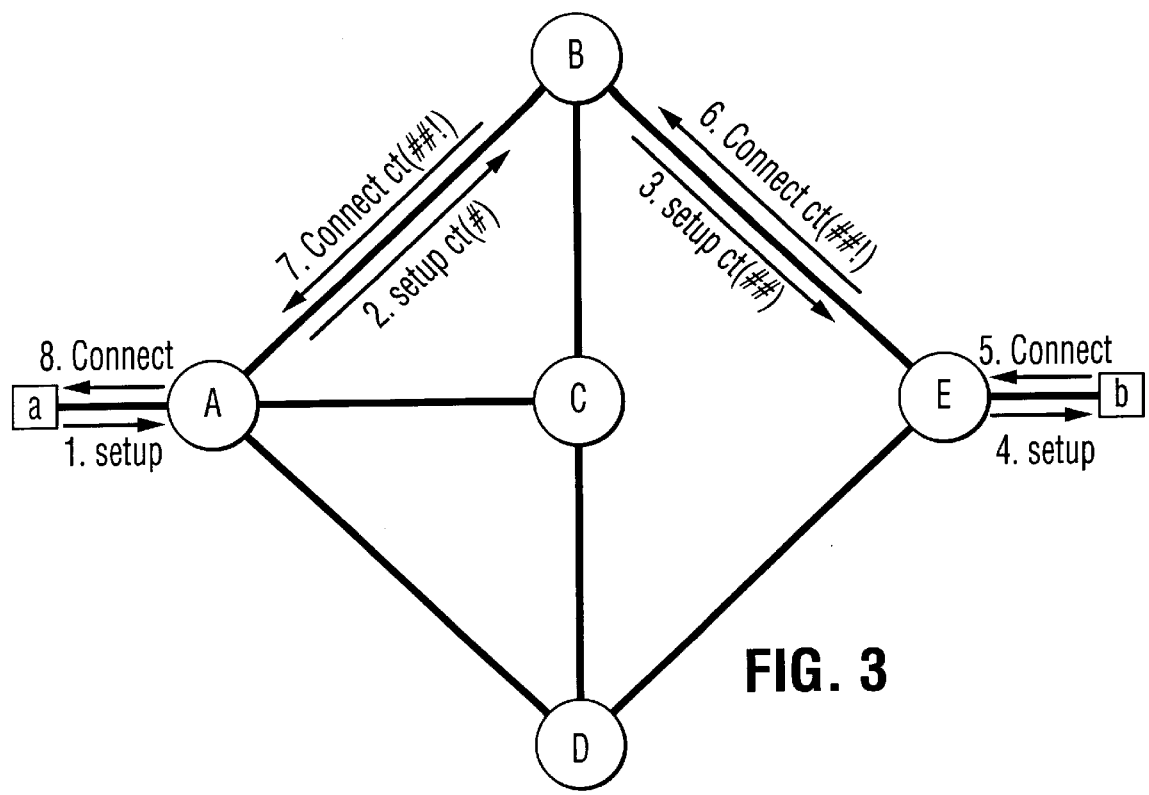
FIG. 3 illustrates diagnostics operation for a call trace of a successful call.

FIG. 3 illustrates the Call Trace feature activated for a successful call. The indicated messages are those which are relevant to the Call Trace feature.

The Setup message originates at user a and progresses through the network along nodes A, B, and E before arriving at user b. User b responds to Setup Message with a Connect message to indicate that the call has successfully completed.

Figure 4:
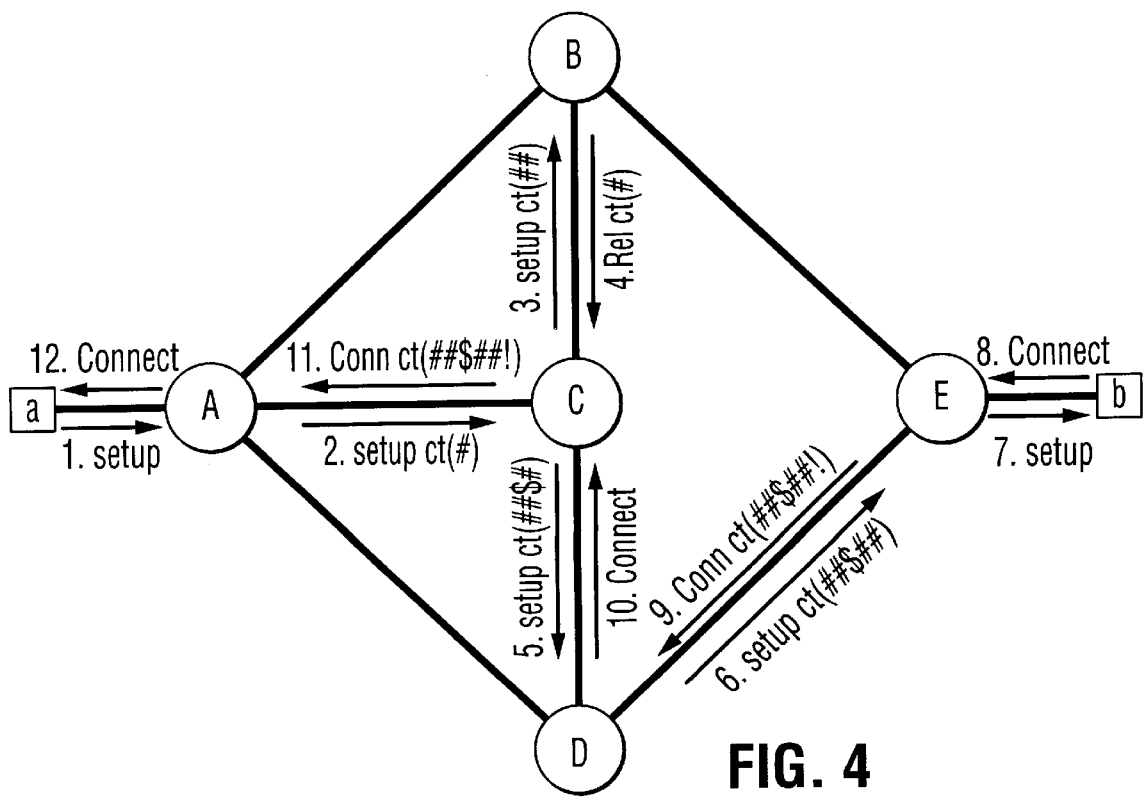
FIG. 4 illustrates diagnostics operation for a call trace of a successful call with one node failure.

FIG. 4 provides a slight variation to the previous figure. In this instance, the Call Trace feature is activated for a successful call with one routing failure at a node. Again, only messages relevant to the Call Trace feature are shown.

The Setup message originates at user a and traverse a path along nodes A, C, and B. At node B a routing failure occurs. The Setup message then transverses a path from B though nodes C, D and E until a successful call completion is reached at user b. A Connect message is then sent back through nodes E, D, C, and A to user a.

Figure 5:
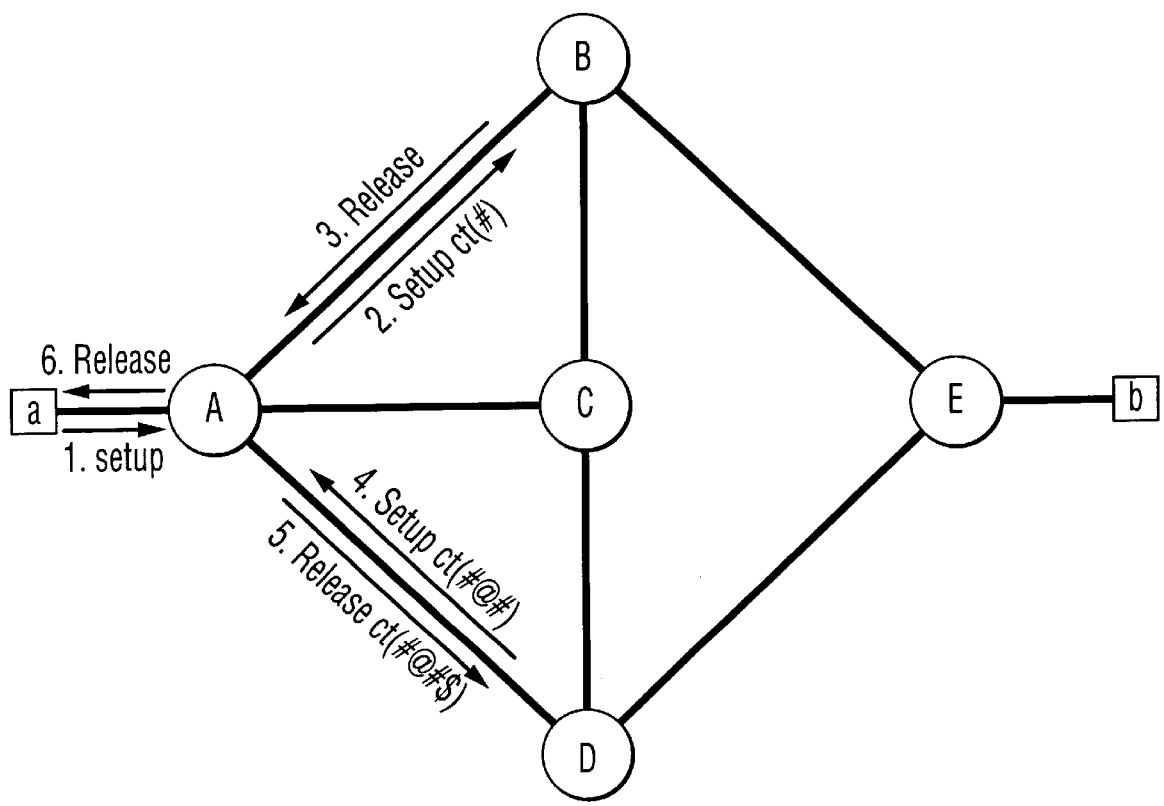
FIG. 5 illustrates diagnostics operation for a call trace of an unsuccessful call.

FIG. 5 depicts a call failure that is the result of multiple node failures. This scenario assumes that route D–E is Out of Service (OOS) and cannot be used to route the call.

The call is initiated from user a through node A. The message progresses by the preferred route to node B. Node B rejects the call due to a resource problem, but does not include a Call Trace IE. The call progresses to node D when the alternate route A–D is selected. Node D also rejects the call. The final Call Trace IE in the Release message from node D contains information of the 2 node failures.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

We claim:

1. A method of detecting and diagnosing faults in a network having a plurality of nodes through which switched virtual connections can be established, comprising the steps of:
   a) entering a diagnostics mode for a given user when a suspected fault is detected;
   b) attempting to establish a virtual connection originating at said given user through a plurality of said nodes on the network to a destination user via a plurality of alternate routes by exchanging call set-up messages through the network;
   c) collecting diagnostics data from each node identifying at least the node and physical trunk group visited on each attempted route through die network to said destination user and returning said diagnostics data in said call set-up messages; and
   d) analyzing the said diagnostics data to identify the source of a failure.

2. A method as claimed in claim 1, wherein said diagnostics data include the nature and location of said failure.

3. A method as claimed in claim 1, wherein the call diagnostics data are returned the originating user.

4. A method as claimed in claim 1, wherein said diagnostics data are carried in an information element of said call set-up messages.

5. A method as claimed in claim 1, wherein said nodes contain hop-by-hop routing tables.

6. A method as claimed in claim 4, wherein said diagnostics data further comprises a reject reason when an attempted route is rejected.

7. A method of detecting and diagnosing faults in a network having a plurality of nodes through which switched virtual connections can be established, comprising the steps of:
   a) entering a diagnostics mode for a given user when a suspected fault is detected;
   b) attempting to establish a virtual connection originating at said given user though the network to a destination user via a plurality of alternate routes;
   c) collecting diagnostics data for each attempted route through the network to said destination user;
   d) analyzing the said diagnostics data to identifying the source of a failure; and
   e) automatically deactivating said diagnostics mode after a predetermined number of connection setups originating from said given user.

8. A method of detecting and diagnosing faults in a network having a plurality of nodes through which switched virtual connections can be established, comprising the steps of:
   a) entering a diagnostics mode for a given user when a suspected fault is detected;
   b) attempting to establish a virtual connection originating at said given user through the network to a destination user via a plurality of alternate routes;
   c) collecting diagnostics data for each attempted route through the network to said destination user, said diagnostics data being carried in a call information element of a setup message; and
   d) analyzing the said diagnostics data to identify the source of a failure; and
   wherein said information element is a call trace element.

9. A method as claimed in claim 8, wherein said call trace element includes a call transited field and a call blocked field.

10. A method as claimed in claim 9, wherein said call transited fields and said call blocked fields include data identifying at least domain and node number of a node encountered on an attempted virtual connection.

11. A method as claimed in claim 10, wherein said call transited and call blocked fields also include data identifying slot number and port number of an encountered node.

12. A method as claimed in claim 10, wherein said call blocked field contains data relating to the nature of a routing failure.

13. A packet switched data communications network, comprising:
   a) a plurality of interconnected network nodes;
   b) a plurality of users connected to at least some of said network nodes;
   c) means for attempting to establish virtual connections between users over a plurality of alternate routes through said network by exchanging call set-up messages through a plurality of said nodes in the network;
   d) means at each node on said alternate routes for inserting diagnostics data identifying at least the node and physical trunk group visited in said call set-up messages while in a diagnostics mode and returning said diagnostics data to an originating node; and
   e) diagnostic means for analyzing said diagnostics data returned in said call set-up messages to identify the source of a failure.

14. A packet switched network as claimed in claim 13, wherein each node comprises means for returning to an originating user, in the diagnostic mode, detailed data relating to the progress of an attempted connection through that node.

15. A packet switched network as claimed in claim 14, wherein each node comprises means for inserting said detailed data into an information element of a message returned to an originating user.

16. A packet switched network as claimed in claim 15, further comprising a Node Management Terminal Interface adapted to analyze said detailed data.

17. A packet switched network as claimed in claim 13, wherein said nodes are ATM switches.

18. A packet switched data communications network, comprising:
   a) a plurality of interconnected network nodes;
   b) a plurality of users connected to at least some of said network nodes;
   c) means for attempting to establish virtual connections between users over a plurality of alternate routes through said network;
   d) means for recording, in a diagnostic mode. attempts at establishing routes through said network; and e) diagnostic means for analyzing said recorded attempts to identify the source of a failure;

wherein said nodes include service cards having a call control unit and a signalling stack for setting up a virtual connection, and a service card managing a virtual connection collects diagnostics information for said recorded attempts at establishing routes through said network.

* * * * *